(12) United States Patent
Ferber

(10) Patent No.: US 8,582,395 B2
(45) Date of Patent: Nov. 12, 2013

(54) MARINE VIBROSEIS MOTION CORRECTION

(75) Inventor: Ralf G. Ferber, Horsham (GB)

(73) Assignee: WesternGeco L.L.C., Houston, TX (US)

( * ) Notice: Subject to any disclaimer, the term of this patent is extended or adjusted under 35 U.S.C. 154(b) by 562 days.

(21) Appl. No.: 12/939,381

(22) Filed: Nov. 4, 2010

(65) Prior Publication Data

US 2012/0113747 A1    May 10, 2012

(51) Int. Cl.
*G01V 1/38* (2006.01)

(52) U.S. Cl.
USPC ............................................ 367/21; 181/110

(58) Field of Classification Search
USPC ................................ 367/21, 23, 56; 181/110
See application file for complete search history.

(56) References Cited

U.S. PATENT DOCUMENTS

| | | | |
|---|---|---|---|
| 6,049,507 A | 4/2000 | Allen | |
| 6,151,556 A | 11/2000 | Allen | |
| 6,480,440 B2 * | 11/2002 | Douma et al. ................. | 367/21 |
| 2008/0046185 A1 | 2/2008 | Niebauer et al. | |
| 2010/0008187 A1 | 1/2010 | Jeffryes | |
| 2010/0208554 A1 * | 8/2010 | Chiu et al. .................... | 367/153 |

OTHER PUBLICATIONS

Dragoset, Marine Vibrators and the Doppler Effect, Geophysics, Nov. 1988, pp. 1388-1398, vol. 53, No. 11.
Duijindam, et al., Reconstruction of Band-Limited Signals, Irregularly Sampled Along one Spatial Direction, Geophysics, Mar.-Apr. 1999, pp. 524-538, vol. 64, No. 2.
Noss, et al., Marine Vibrator Motion Correction in the Frequency-Space Domain, SEG Expanded Abstracts, 1999.
Rozemond, et al., Slip-Sweep Acquisition, SEG, 1999, pp. 64-67.
Schultz, et al., Simple Theory for Correction of Marine Vibroseis Phase Dispersion, SEG, 1989, pp. 660-662.
Zwartjes, et al., Fourier Reconstruction of Nonuniformly Sampled, Aliased Seismic Data, Geophysics, Jan.-Feb. 2007, pp. V21-V32, vol. 72, No. 1.
Hampson, et al., The Effects of Source and Receiver Motion on Seismic Data, Geophysical Prospecting, 1995, pp. 221-244, vol. 43, No. 2.
Moore, et al., Bandwidth Optimization for Compact Fourier Interpolation, 70th EAGE Conference and Exhibition, Jun. 2008.
International Search Report and Written Opinion of PCT Application No. PCT/US2011/058792 dated Jun. 22, 2012: pp. 1-10.

* cited by examiner

*Primary Examiner* — Ian J Lobo

(57) ABSTRACT

A method for processing seismic data. The method includes receiving the seismic data acquired at one or more receivers due to one or more marine vibroseis sources that emit one or more vibroseis sweeps. The method then applies a receiver motion correction algorithm to the received seismic data to generate receiver motion corrected seismic data. After generating the receiver motion corrected seismic data, the method transforms the receiver motion corrected seismic data into a temporal Fourier domain to generate seismic data as a function of frequency. The method then reconstructs the transformed seismic data as a function of frequency to correct for one or more motions of the one or more marine vibroseis sources. After reconstructing the transformed seismic data, the method transforms the reconstructed seismic data to the time domain. The method then generates a seismic image of a subsurface of the Earth based on the transformed reconstructed seismic data.

20 Claims, 5 Drawing Sheets

MARINE VIBROSEIS MOTION CORRECTION

BACKGROUND

1. Field of the Invention

Implementations of various technologies described herein generally relate to methods and systems for processing seismic data for a towed marine survey.

2. Description of the Related Art

The following descriptions and examples are not admitted to be prior art by virtue of their inclusion within this section.

Seismic data signals are typically acquired by measuring and recording data during a land or marine seismic survey. A land seismic survey may be performed by repeatedly firing an impulsive seismic energy source at the surface of the earth and recording the received signals at a set of sensors or receivers. Similarly, a marine seismic survey may be performed by repeatedly firing an impulsive seismic energy source (e.g., air-guns, dynamite, marine vibrators or the like) into the sea or at the seafloor and recording the received signals at a set of receivers.

In a towed marine seismic survey, the receivers are typically disposed on seismic streamers and the source is disposed on a seismic source array. Both, the seismic streamers and the seismic source array, may be towed across the sea by a vessel. The sensors may typically be laterally displaced at regular intervals along the seismic streamers. However, there may be situations where a non-regular distribution of the sensors may be preferred or where the source array and the streamers may be positioned at different depth levels.

During the marine seismic survey, the cycle of firing the source and recording the received signals may be repeated a plurality of times. Vibroseis is a seismic method in which a vibrator is used as an energy source to generate a controlled wavetrain. A vibrator is an instrument which produces mechanical oscillations used as a seismic source for vibroseis. As such, during a seismic survey, the vibroseis seismic source applies a sinusoidal vibration of continuously varying frequencies into the surrounding medium during a sweep period typically lasting several seconds. In upsweeping, the vibroseis seismic source initially applies a low frequency sinusoidal vibration and increases the frequency of the vibration with time. Conversely, in downsweeping, the vibroseis seismic source initially applies the highest frequency sinusoidal vibration and decreases the frequency of the vibration with time. In either case, the frequency usually changes linearly with respect to time.

In order to acquire a conventional seismic record from the vibroseis seismic source, the field record, which consists of the superposition of many long reflected wavetrains, should be correlated with a sweep wavetrain. The correlated record then resembles a conventional seismic record such as those created using an impulsive source, as opposed to a vibroseis source.

The vibroseis technique is usually associated with land seismic surveys, but it may also be used with marine seismic surveys. In order to use the vibroseis technique with marine seismic surveys, the seismic data acquired via the vibroseis sources should be processed to address the fact that the sources move a certain distance during the transmission of its wavetrain.

SUMMARY

Described herein are implementations of various techniques and technologies for a method for processing seismic data acquired from a marine seismic survey. In one implementation, the method may include receiving the seismic data acquired at one or more receivers due to one or more marine vibroseis sources that emit one or more vibroseis sweeps. The method may then apply a receiver motion correction algorithm to the received seismic data to generate receiver motion corrected seismic data. After generating the receiver motion corrected seismic data, the method may transform the receiver motion corrected seismic data into a temporal Fourier domain to generate seismic data as a function of frequency. The method may then include reconstructing the transformed seismic data as a function of frequency to correct for one or more motions of the one or more marine vibroseis sources. After reconstructing the transformed seismic data, the method may transform the reconstructed seismic data to the time domain. The method may then generate a seismic image of a subsurface of the Earth based on the transformed reconstructed seismic data.

In another implementation, the method for processing seismic data acquired from the marine seismic survey may include receiving the seismic data acquired at one or more receivers due to one or more marine vibroseis sources that emit one or more vibroseis sweeps using a slip-sweep technique. The method may then apply a receiver motion correction algorithm to the seismic data to generate receiver motion corrected seismic data. After applying the receiver motion correction algorithm to the seismic data, the method may transform the receiver motion corrected seismic data into a temporal Fourier domain to generate seismic data as a function of frequency. The method may then reconstruct the transformed seismic data as a function of frequency to correct for one or more motions of the one or more marine vibroseis sources. The method may also include transforming the reconstructed seismic data to a time domain and generating a seismic image of a subsurface of the Earth based on the transformed reconstructed seismic data.

In yet another implementation, the method for processing seismic data acquired from the marine seismic survey may include receiving the seismic data acquired at one or more receivers due to one or more marine vibroseis sources that emit one or more vibroseis sweeps. The method may then apply a receiver motion correction algorithm to the seismic data to generate receiver motion corrected seismic data. After generating the receiver motion corrected seismic data, the method may perform a sweep correlation on the receiver motion corrected seismic data. The method may also include transforming the sweep correlated seismic data into a temporal Fourier domain to generate seismic data as a function of frequency. The method may then reconstruct the seismic data as a function of frequency to correct for one or more motions of the one or more marine vibroseis sources. After reconstructing the seismic data as a function of frequency, the method may transform the reconstructed seismic data to a time domain and generate a seismic image of a subsurface of the Earth based on the transformed reconstructed seismic data.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
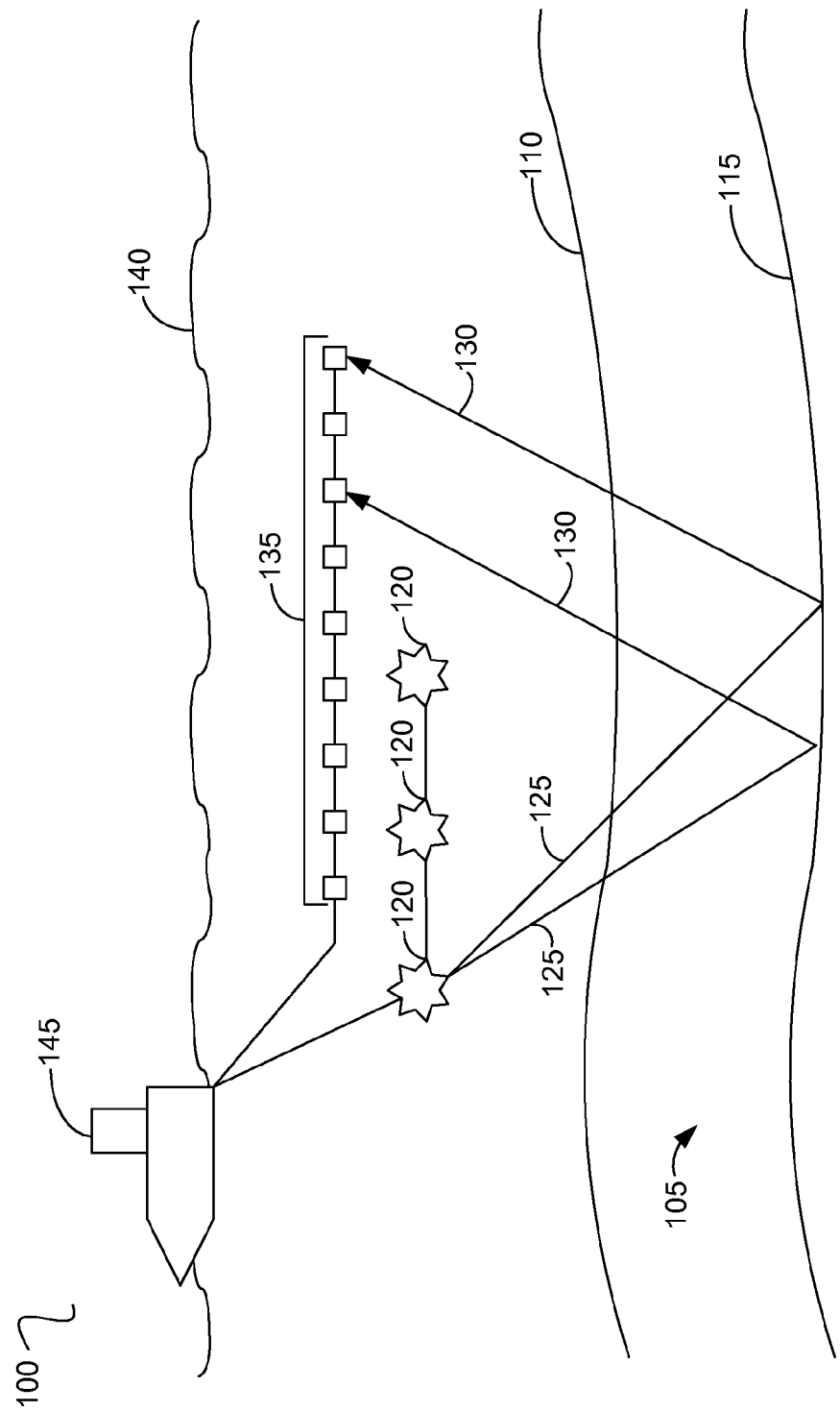
FIG. 1 illustrates a marine-based survey of a subterranean subsurface in accordance with one or more implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide an executive summary of various techniques described herein. In general, various techniques described herein are directed to a system for correcting seismic data for distortions embedded within the acquired seismic data due to the motion of marine vibroseis sources during a marine seismic survey. The seismic data may have been acquired during the marine seismic survey while the marine vibroseis sources were being towed by a vessel. The seismic data may be based on individually towed common-receiver gathers of a slip-sweep marine vibroseis survey. As such, the system for correcting marine seismic data may benefit from a marine slip-sweep vibroseis operation, similar to that of a land slip-sweep vibroseis operation to reduce the source sampling interval.

In one implementation, a computer application may be used to correct the seismic data for distortions embedded therein. The computer application may first perform a receiver motion correction on the seismic data. By performing the receiver motion correction, the computer application may obtain seismic data that may have been acquired from a marine seismic survey with fixed receivers.

The computer application may then transform the receiver motion corrected seismic data received at each receiver into the temporal Fourier domain. In this manner, the seismic data received by the receivers may be interpreted as seismic data from fixed receiver locations and frequency dependent source locations, and the process described herein may act on the seismic data acquired from common receiver gathers created for each frequency. The computer application may then reconstruct the seismic data based on the source locations and the time at which each source first emitted its vibroseis sweep.

In one implementation, the individual seismograms may include a frequency band that may be composed of aliased and non-aliased seismic data. In order to reconstruct the seismic data, the computer application may correct for the source motion using a standard interpolation technique for lower frequencies, because the lower frequency seismic data may be non-aliased. Conversely, for higher frequencies, the seismic data may be aliased. For these higher frequencies, the computer application may correct for the source motion using an interpolation technique that is designed to interpolate aliased seismic data.

After correcting for the source motion, the computer application may transform the reconstructed seismic data into the time domain by applying an inverse temporal Fourier transform to obtain the source motion corrected marine vibroseis seismic data.

One or more implementations of various techniques for processing seismic data acquired from a marine seismic survey will now be described in more detail with reference to FIGS. 1-5 in the following paragraphs.

FIG. 1 illustrates a marine-based survey 100 of a subterranean subsurface 105 in accordance with one or more implementations of various techniques described herein. The subsurface 105 includes the seafloor surface 110 and a reflector 115. In one implementation, seismic sources 120 may include regularly or irregularly spaced marine vibroseis sources. Seismic sources 120 may include marine vibroseis sources, which may propagate energy signals into the Earth over an extended period of time, as opposed to the nearly instantaneous energy provided by impulsive sources. The energy signals propagated into the Earth by marine vibroseis sources may be propagated as a frequency sweep signal. As such, the marine vibroseis sources may initially emit an energy signal at a low frequency (e.g., 5 Hz) and increase the energy signal to a high frequency (e.g., 80-90 Hz).

In one implementation, seismic sources 120 may operate in a marine slip-sweep vibroseis mode to reduce the source sampling interval. The slip-sweep technique may include a first vibrator group sweeping without waiting for the previous vibrator group's sweeping to finish its sweep.

Seismic sources 120 may propagate energy signals 125 (only two are indicated) into the subsurface 105. The component(s) of the energy signals 125 may be reflected and converted by reflector 115, and reflections 130 may be received by a plurality of seismic receivers 135. The seismic receivers 135 may generate electrical signals representative of the received reflections 130. The electrical signals may be embedded with information regarding the subsurface 105 and captured as a record of seismic data.

The electrical signals may be transmitted to a vessel 145 via transmission cables, wireless communication or the like. The vessel 145 may then transmit the electrical signals to a data processing center or may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by each of the seismic sensors. In one implementation, the seismic data may be processed to generate a seismic image of the subsurface 105.

Figure 2:
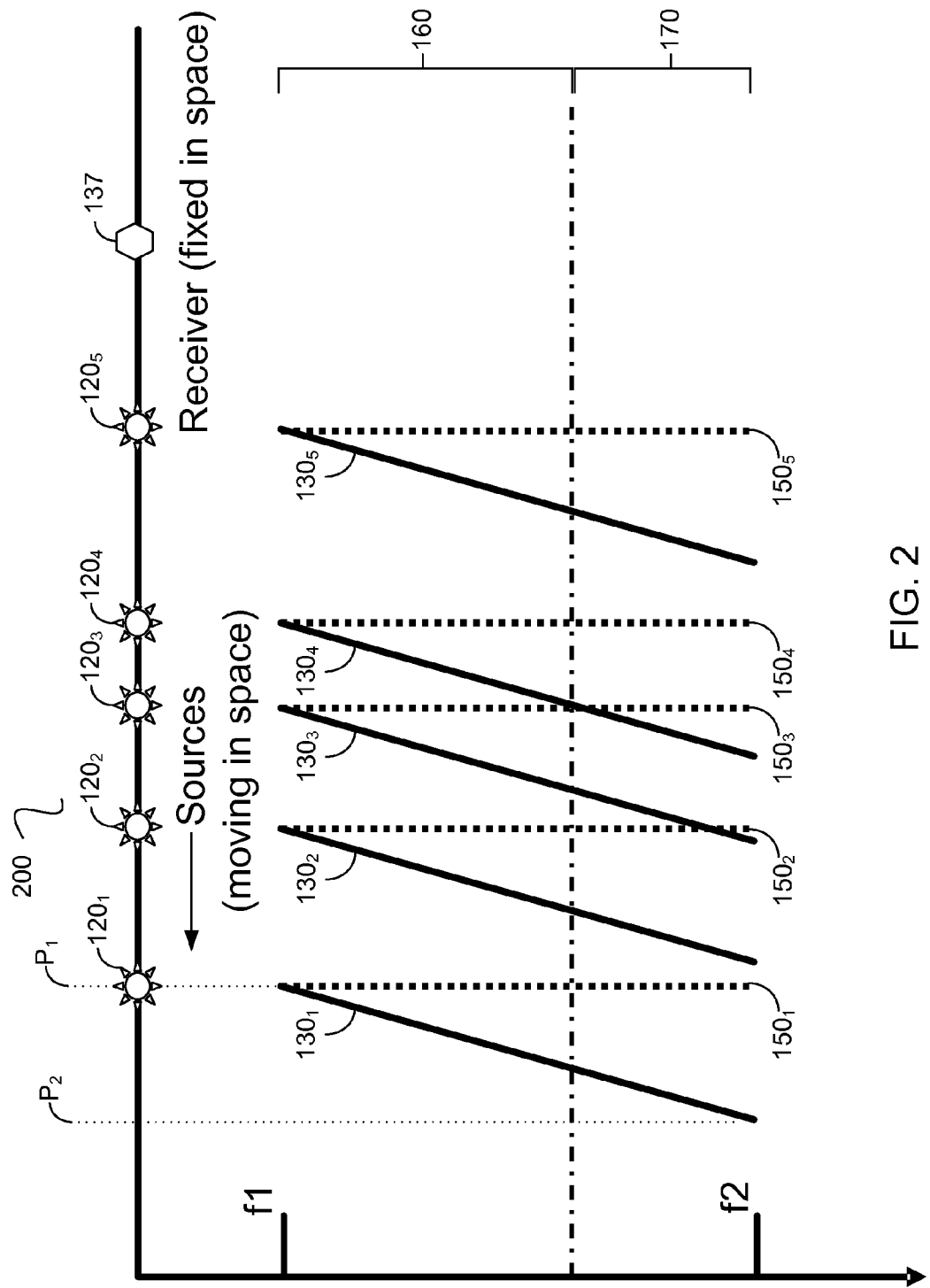
FIG. 2 illustrates a marine-based survey of a subterranean surface having seismic sources being towed with respect to frequency in accordance with one or more implementations of various techniques described herein.

FIG. 2 illustrates a marine-based survey of a subterranean surface having seismic sources being towed with respect to frequency in accordance with one or more implementations of various techniques described herein. The following description of marine-based survey 200 is made with reference to the marine-based survey 100 of FIG. 1. Marine-based survey 200 includes sources 120, receivers 135, source position line 130, source motion corrected position line 150, non-aliased seismic data region 160 and aliased seismic data region 170.

Marine-based survey 200 illustrates the position of each source 120 at the start of its sweep, i.e. frequency f1. Sources 120 in marine-based survey 200 are being towed to the left away from receivers 135. Receiver 137 represents a virtual receiver fixed in space. The virtual receiver 137 may have been obtained by correcting the seismic data received by a receiver (e.g., receivers 135 in FIG. 1) in the marine-based survey 100 for receiver motion. In this manner, although sources 120 move in marine-based survey 200, receivers 135 may be considered to be fixed in their location due to the receiver motion correction applied to the seismic data. Marine-based survey 200 only illustrates a single virtual receiver 137, but it should be understood that a virtual fixed location receiver may be simulated for each receiver in the marine-based survey 100. This concept is described in more detail at step 320 of method 300 below.

In one implementation, sources 120 may perform a sinusoidal sweep starting at frequency f1 and ending at frequency f2. The position of each source 120 on marine-based survey 200 with respect to frequency is illustrated on seismic data position line 130. Source $120_1$ is initially positioned at position $P_1$ and is eventually positioned at position $P_2$. Position $P_1$ corresponds to the location of source $120_1$ when source $120_1$ starts its frequency sweep (i.e., frequency f1). Similarly, position $P_2$ corresponds to the location of source $120_1$ when it ends its frequency sweep (i.e., frequency f2).

Methods 300 and 400 described below may be used to interpolate seismic data acquired by receivers 135 due to each source 120 such that each source 120 may have a fixed location for the duration of the sweep (i.e., from frequency f1 to frequency f2). In one implementation, the fixed location may be the position where the source first starts its sweep (i.e., source motion corrected position line 150).

Generally, for lower frequencies of the frequency sweep, the seismic data may be non-aliased seismic data. Conversely, for higher frequencies of the frequency sweep, the seismic data may be aliased seismic data. Non-aliased seismic data is denoted by non-aliased seismic data region 160, and aliased seismic data is denoted by aliased seismic data region 170. Aliases may be present in the seismic data when the data sampling is regular but too sparse (i.e., spatially aliased). In one implementation, the threshold between the non-aliased seismic data region 160 and aliased seismic data region 170 may depend on a vessel speed and a distance between sources 120 in a common receiver gather. As the distance between sources 120 decreases, the threshold for the aliased seismic data region 170 may increase. In one implementation, if sources 120 emit its energy signal using a slip-sweep technique, the threshold for the aliased seismic data may increase to a point above the highest seismic frequency (i.e., the highest frequency in the sweep wavetrain, frequency f2).

Figure 3:
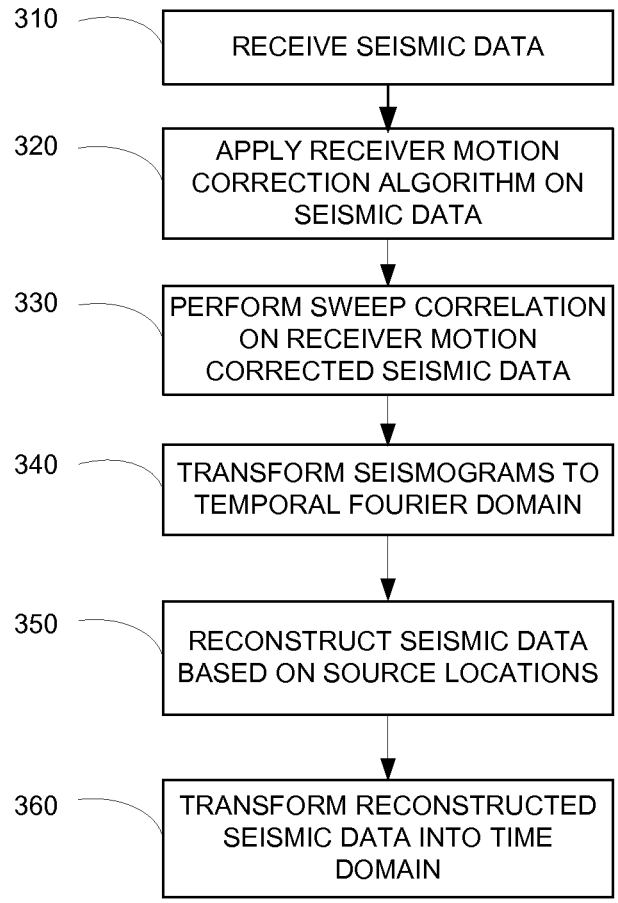
FIG. 3 illustrates a flow chart of a method for correcting seismic data for vibroseis source motion in accordance with implementations described herein.

FIG. 3 illustrates a flow chart of a method 300 for correcting seismic data for vibroseis source motion in accordance with implementations described herein. It should be understood that while the flow chart indicates a particular order of execution, in some implementations, certain operations of method 300 may be executed in a different order. In one implementation, method 300 may be performed by a computer application. The following description of method 300 is made with reference to the marine-based survey 100 of FIG. 1 and marine-based survey 200 of FIG. 2.

At step 310, the computer application may receive seismic data from receivers 135 as shown in marine seismic survey 100. While being towed, each receiver 135 may continuously record the seismic data it receives from reflections 130. As such, the seismic data received by each receiver 135 may be defined according to a function of time and space. The time may represent the time at which the seismic data was received or acquired, and the space may indicate a position on the earth where the seismic data was received or acquired.

The received seismic data may include streamer data for each source 120 operating in a slip-sweep mode. In one implementation, the sources 120 may be marine vibroseis sources. Method 300 may benefit from marine slip-sweep vibroseis operation to reduce the source sampling interval. As mentioned above, the slip-sweep technique essentially consists of a vibrator group sweeping without waiting for the previous group's sweeping being finished.

At step 320, the computer application may apply a receiver motion correction algorithm on the seismic data received at each receiver 135. The receiver motion correction algorithm is described in more detail in Hampson and Jakubowicz, *The Effects of Source and Receiver Motion on Seismic Data*, Geophysical Prospecting 43, p. 2212-244, 1995. In one implementation, the seismic data received at each receiver 135 may be uncorrelated. As such, the computer application may apply the receiver motion correction algorithm to uncorrelated seismic data. After applying the receiver motion correction algorithm to the uncorrelated seismic data, the computer application may simulate a virtual receiver 137 that has a fixed location for each receiver 135 in the marine-based seismic survey 100. After simulating the seismic data received at the virtual receiver 137, the computer application may consider sources 120 as moving in the direction of the vessel, away from fixed virtual receiver 137. The seismic data recorded at the virtual receiver 137 may be a common receiver gather. As such, the seismic data acquired by the virtual receiver 137 may include all of the seismograms associated with sources 120 (i.e., sources at different locations).

At step 330, the computer application may perform a sweep correlation on the receiver motion corrected seismic data based on the frequencies of the sources 120. The correlation, which acts as a time-frequency filter, may extract individual records from the receiver motion corrected seismic data. For instance, the computer application may perform the sweep correlation on the receiver motion corrected seismic data with the frequencies used in the sweep by the sources 120 (i.e., sweep wavetrain). Since receivers 135 may be continually recording seismic data, the computer application may receive a large amount of seismic data for processing which may make the computing costs for performing method 300 expensive. Therefore, by performing the sweep correlation on the received seismic data, the computations involved in method 300 may be performed more efficiently. Although step 330 may allow the computer application to perform method 300 more efficiently, it should be noted that step 330 is an optional step and is not required to perform method 300.

At step 340, the computer application may transform the receiver motion corrected seismic data into the temporal Fourier domain. In one implementation, the computer application may transform each individual seismogram in the receiver motion corrected seismic data into the temporal Fourier domain. In this manner, the seismic data received by the receivers may be interpreted as seismic data acquired at fixed receiver locations and at frequency dependent source locations. The seismic data may then be characterized as a function of frequency as received by a fixed receiver. As a result, the computer application may consider the marine-based survey 200 as having a slightly different acquisition geometry for each frequency, because the source coordinates vary with the temporal frequencies, while the receiver coordinates stay unchanged.

The remaining steps of method 300 may include a multichannel filtering process on the common receiver gather (i.e., seismic data acquired at the virtual receiver 137). However, in order to correct the seismic data of the common receiver gather for vibroseis source motion, the multi-channel filtering process may need to compensate for irregularly spaced sources 120 and for aliased seismic data. As mentioned above, aliases may be present in the seismic data when the data sampling is too sparse (i.e., spatially aliased).

At step 350, the computer application may reconstruct the seismic data based on the source locations and the frequency that source 120 may be emitting during its vibroseis sweep. In this manner, the frequency dependent geometries may be back projected onto common fixed source locations using frequency dependent interpolations or regularization schemes.

In one implementation, the computer application may use a vessel speed and the time-frequency function of the vibroseis' sweep to compute the location of the source for each frequency. In order to compute the location of the source for each frequency, the computer application may first create a frequency slice of each common-receiver gather (i.e., all samples have the receiver in common) that varies with the source. The computer application may then determine the position of each source 120 at each frequency to obtain a location for each source 120 as a function of frequency.

The computer application may then use interpolation filters to back project each frequency dependent source location to the source location at the start of the source emitting the sweep, i.e., frequency f1. As such, the computer application may reconstruct the seismic data at each source location for a particular source such that the particular source is located at the same position during the entire vibroseis sweep. For example, the computer application may reconstruct the seismic data received by virtual receiver 137 such that source $120_1$ was positioned at position $P_1$ for the duration of the vibroseis sweep (i.e., frequency f1 to frequency f2). In one implementation, the reconstruction process may act on common receiver gathers that may have been acquired for each frequency. By reconstructing the seismic data, the computer application may correct the seismic data for the source motion.

In one implementation, the seismic data may be reconstructed based on a data interpolation technique. For instance, for each frequency, the computer application may receive seismic data that has been spatially sampled at frequency dependent source locations. The computer application may then interpolate the seismic data such that the source was fixed in its location according to spatial interpolation. Typically, the computer application may interpolate the seismic data such that the source was fixed at a position where the source was initially located when the source emitted its first frequency (i.e., frequency f1).

In order to accurately reconstruct the seismic data, the computer application may need to compensate for aliasing effects. As such, for the source vibrations in the frequency band having non-aliased seismic data (i.e., region 160), the computer application may correct for the source motion using a standard interpolation technique, or the interpolation technique described in commonly assigned U.S. patent application Ser. No. 12/043,321, entitled Interpolation Of Irregular Data. In one implementation, for lower frequencies, the computer application may back project the non-aliased seismic data using a one-dimensional Fourier regularization algorithm, as described by A. J. W. Duijndam and Schonewille in *Reconstruction of Bandlimited Signals, Irregularly Sampled Along One Spatial Direction*, Geophysics 64, 539-551, 1999 and by Moore and Ferber in *Bandwidth Optimization for Compact Fourier Interpolation*, EAGE meeting, Rome, 2008

For higher frequencies that are outside of the frequency band having aliased seismic data (i.e., region 170), the computer application may correct for source motion using an interpolation technique designed to interpolate aliased seismic data. For example, techniques described by Zwartjes and Saachi in *Fourier Reconstruction of Non-Uniformly Sampled, Irregular Data*, SEG expanded abstract, 2007, may be used to back project aliased seismic data at higher frequencies. However, as mentioned above, by using a slip-sweep vibroseis technique, as described by Rozemond in *Slip-Sweep Acquisition*, presented at the $66^{th}$ SEG meeting, 1996), the seismic data may be spatially non-aliased even at the highest source emitted frequency. The use of the slip-sweep vibroseis technique may push the frequency at which spatial aliasing occurs above the seismic frequency band. The slip-sweep technique essentially consists of a vibrator group sweeping without waiting for the previous group's sweeping to finish. The correlation step (i.e., step 330) may then act as a time-frequency filter that may extract individual seismic records.

At step 360, the computer application may transform the reconstructed seismic data into the time domain by applying an inverse temporal Fourier transform. As a result, the computer application may obtain the source motion corrected marine vibroseis seismic data.

Method 300 described above may be used to correct for vibroseis source motion of conventional towed-marine surveys using pressure sensing streamers, as well as for data using over/under cable configurations, multi-component streamer data, marine coil surveys or the like.

Figure 4:
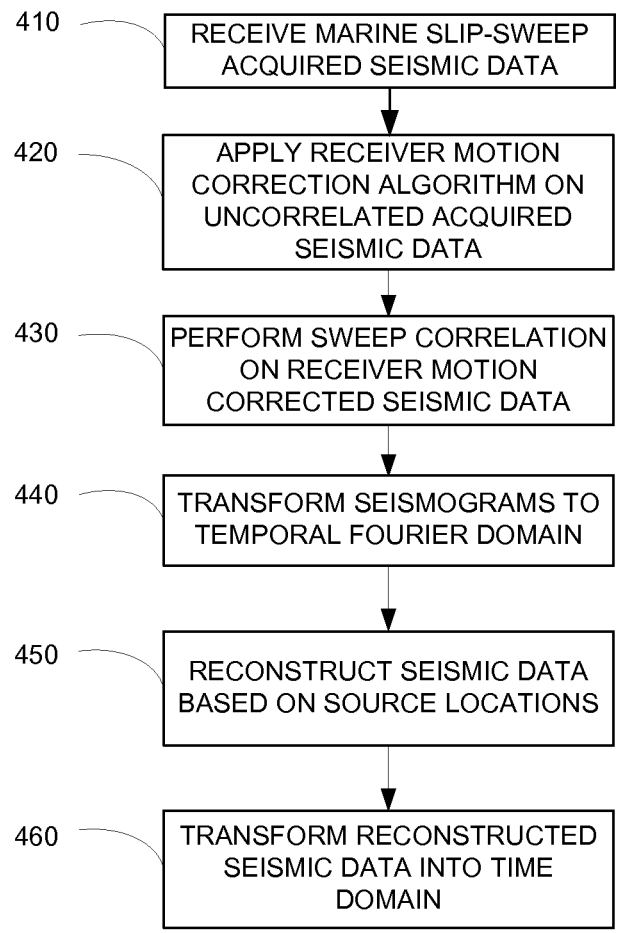
FIG. 4 illustrates a flow chart of a method for correcting seismic data acquired using a slip-sweep technique for vibroseis source motion in accordance with implementations described herein.

FIG. 4 illustrates a flow chart of a method 400 for correcting seismic data acquired using a slip-sweep technique for vibroseis source motion in accordance with implementations described herein. It should be understood that while the flow chart indicates a particular order of execution, in some implementations, certain operations of method 400 may be executed in a different order. In one implementation, method 400 may be performed by a computer application. The following description of method 400 is made with reference to the marine-based survey 100 of FIG. 1 and marine-based survey 200 of FIG. 2.

At step 410, the computer application may receive marine slip-sweep acquired seismic data from receivers 135 as shown in marine seismic survey 100. As such, the marine vibroseis sources used in the marine seismic survey may have emitted seismic energy using a slip-sweep technique.

At step 420, the computer application may apply a receiver motion correction algorithm on the marine slip-sweep acquired seismic data received at each receiver 135. The marine slip-sweep acquired seismic data received at each receiver 135 may be uncorrelated such that the computer application may apply the receiver motion correction algorithm to uncorrelated seismic data. After applying the receiver motion correction algorithm to the uncorrelated seismic data, the computer application may simulate a virtual receiver 137 that has a fixed location for each receiver 135 in the marine-based seismic survey 100. After simulating the marine slip-sweep acquired seismic data received at the virtual receiver 137, the computer application may consider sources 120 as moving in the direction of the vessel, away from fixed virtual receiver 137. The marine slip-sweep acquired seismic data recorded at the virtual receiver 137 may be a common receiver gather. As such, the marine slip-sweep acquired seismic data acquired by the virtual receiver 137 may include all of the seismograms associated with sources 120 (i.e., sources at different locations).

At step 430, the computer application may perform a sweep correlation on the receiver motion corrected seismic data based on the frequencies of the sources 120. By performing the sweep correlation on the receiver motion corrected seismic data, the computer application may create individual shot records for each source 120. In this manner, the computations involved in method 400 may be performed more efficiently. Although step 430 may allow the computer application to perform method 400 more efficiently, it should be noted that step 430 is an optional step and is not required to perform method 400.

At step 440, the computer application may transform the receiver motion corrected seismic data into the temporal Fourier domain. In one implementation, the computer application may transform each individual seismogram in the receiver motion corrected seismic data into the temporal Fourier domain.

At step 450, the computer application may reconstruct the seismic data based on the source locations and the frequency that source 120 may be emitting during its vibroseis sweep. In this manner, the frequency dependent geometries may be back projected onto common fixed source locations using frequency dependent interpolations or regularization schemes.

As mentioned above with regard to method 300, in order to accurately reconstruct the seismic data, the computer application may need to compensate for aliasing effects. However, by using marine slip-sweep acquired seismic data, the receiver motion corrected transformed seismic data may primarily include spatially non-aliased seismic data at the highest source emitted frequency due to the fact that the slip-sweep vibroseis technique may push the frequency at which spatial aliasing occurs above the seismic frequency band. Therefore, the computer application may back project the non-aliased seismic data using a one-dimensional Fourier regularization algorithm.

However, if some of the receiver motion corrected transformed seismic data includes aliased seismic data (i.e., region 170), the computer application may correct for source motion using an interpolation technique designed to interpolate aliased seismic data.

At step 460, the computer application may transform the reconstructed seismic data into the time domain by applying an inverse temporal Fourier transform. As a result, the computer application may obtain the source motion corrected marine vibroseis seismic data.

Figure 5:
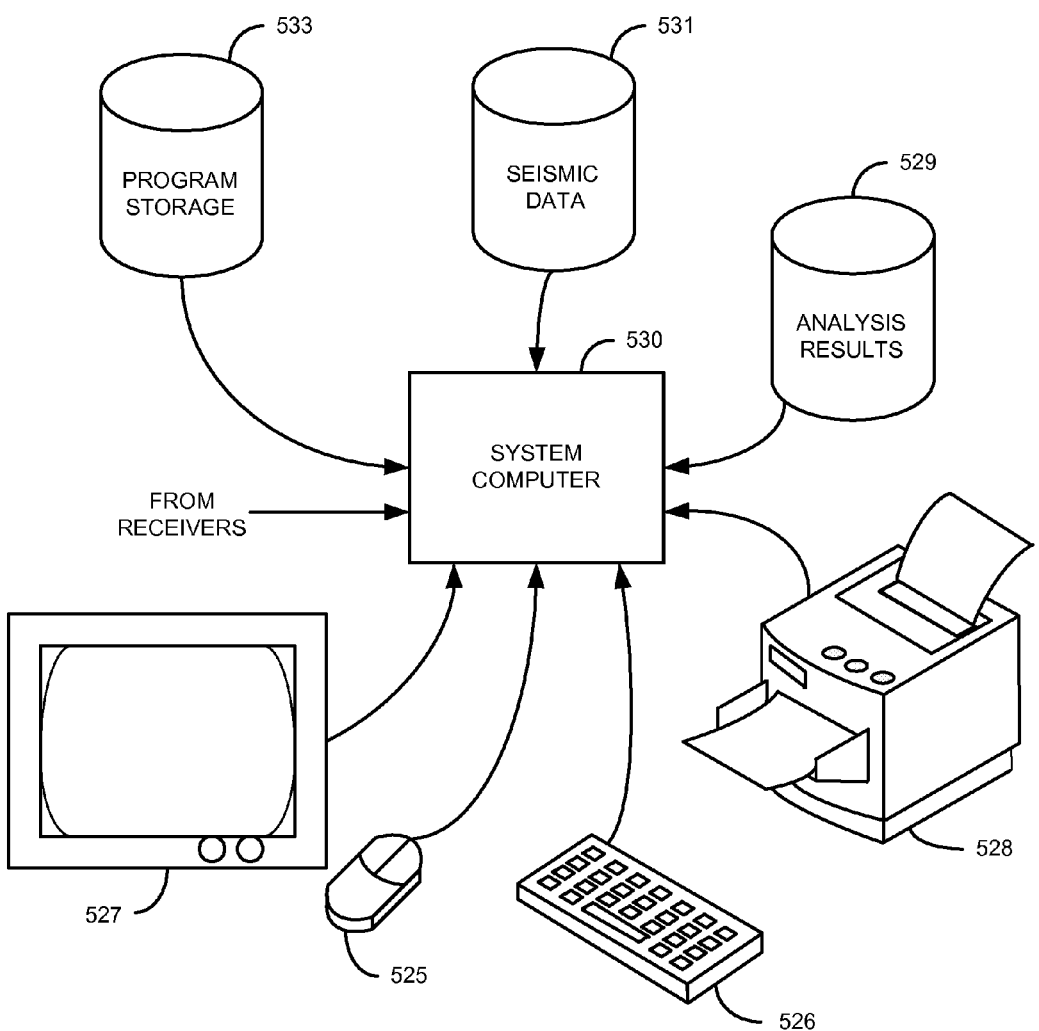
FIG. 5 illustrates a computer network into which implementations of various technologies described herein may be implemented.

FIG. 5 illustrates a computer network 500, into which implementations of various technologies described herein may be implemented. In one implementation, various techniques for correcting seismic data for vibroseis source motion as described in FIGS. 3-4 may be performed using the computer network 500. The computer network 500 may includes a system computer 530, which may be implemented as any conventional personal computer or server. However, it should be understood that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, high-performance clusters of computers, co-processing-based systems (GPUs, FPGAs) and the like. In one implementation, the computer application described in the method of FIG. 5 may be stored on the system computer 530.

The system computer 530 is in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one implementation, seismic data from hydrophones are stored in disk storage device 531. The system computer 530 may retrieve the appropriate data from the disk storage device 531 to process seismic data according to program instructions according to program instructions that correspond to the implementations of various technologies described herein. The program instructions may be written in a computer programming language, such as C++, Java and the like. The program instructions may be stored in a computer-readable memory, such as program disk storage device 533. Such computer-readable media may include computer storage media and communication media.

Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 500.

Communication media may embody computer readable instructions, data structures or other program modules. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 530 may present output primarily onto graphics display 527. The system computer 530 may store the results of the methods described above on disk storage 529, for later use and further analysis. The keyboard 526, the pointing device (e.g., a mouse, trackball, or the like) 525 and the printer 528 may be provided with the system computer 530 to enable interactive operation.

The system computer 530 may be located at a data center remote from the survey region. The system computer 530 is in communication with hydrophones (either directly or via a recording unit, not shown), to receive signals indicative of the reflected seismic energy. After conventional formatting and other initial processing, these signals may be stored by the system computer 530 as digital data in the disk storage 531 for subsequent retrieval and processing in the manner described above. In one implementation, these signals and data may be sent to the system computer 530 directly from sensors, such as geophones, hydrophones and the like. When receiving data directly from the sensors, the system computer 530 may be described as part of an in-field data processing system. In another implementation, the system computer 530 may process seismic data already stored in the disk storage 531. When processing data stored in the disk storage 531, the system computer 530 may be described as part of a remote data processing center, separate from data acquisition. The system computer 530 may be configured to process data as part of the in-field data processing system, the remote data processing system or a combination thereof. While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data, comprising:
   receiving the seismic data acquired at one or more receivers due to one or more marine vibroseis sources that emit one or more vibroseis sweeps;
   applying a receiver motion correction algorithm to the seismic data to generate receiver motion corrected seismic data;
   transforming the receiver motion corrected seismic data into a temporal Fourier domain to generate seismic data as a function of frequency;
   reconstructing the transformed seismic data as a function of frequency to correct for one or more motions of the one or more marine vibroseis sources;
   transforming the reconstructed seismic data to a time domain; and
   generating a seismic image of a subsurface of the Earth based on the transformed reconstructed seismic data.

2. The method of claim 1, further comprising performing a sweep correlation on the receiver motion corrected seismic data before transforming the receiver motion corrected seismic data.

3. The method of claim 2, wherein the sweep correlation is based on one or more frequencies of the vibroseis sweeps.

4. The method of claim 1, wherein the received seismic data is uncorrelated.

5. The method of claim 1, wherein the receiver motion corrected seismic data modifies the seismic data as if the seismic data were acquired at one or more fixed positions.

6. The method of claim 1, wherein reconstructing the transformed seismic data comprises back projecting the seismic data onto a fixed location for each marine vibroseis source.

7. The method of claim 6, wherein the seismic data is back projected using one or more interpolation filters.

8. The method of claim 6, wherein the fixed location corresponds to where one of the marine vibroseis sources starts its vibroseis sweep.

9. The method of claim 1, wherein the transformed seismic data comprises an aliased frequency region and a non aliased frequency region.

10. The method of claim 9, wherein reconstructing the transformed seismic data comprises compensating the seismic data in the aliased frequency region for one or more aliasing effects.

11. The method of claim 9, wherein the seismic data in the aliased frequency region comprises one or more frequencies above a predetermined frequency threshold.

12. The method of claim 11, wherein the predetermined frequency threshold is determined based on a vessel speed and one or more distances between the marine vibroseis sources.

13. The method of claim 9, wherein the seismic data in the aliased frequency region is reconstructed by back projecting the seismic data in the aliased frequency region onto a fixed location for each marine vibroseis source using an interpolation technique designed to interpolate aliased seismic data.

14. The method of claim 9, wherein the seismic data in the non-aliased frequency region is reconstructed by back projecting the seismic data in the non-aliased frequency region onto a fixed location for each marine vibroseis source using a one-dimensional Fourier regularization algorithm.

15. The method of claim 9, wherein the seismic data in the non-aliased frequency region comprises one or more frequencies below a predetermined frequency threshold.

16. The method of claim 1, wherein the one or more marine vibroseis sources emit the vibroseis sweeps using a slip-sweep technique.

17. A computer system, comprising:
   a processor; and
   a memory comprising program instructions executable by the processor to:
      receive the seismic data acquired at one or more receivers due to one or more marine vibroseis sources that emit one or more vibroseis sweeps using a slip-sweep technique;
      apply a receiver motion correction algorithm to the seismic data to generate receiver motion corrected seismic data;
      transform the receiver motion corrected seismic data into a temporal Fourier domain to generate seismic data as a function of frequency;
      reconstruct the transformed seismic data as a function of frequency to correct for one or more motions of the one or more marine vibroseis sources;
      transform the reconstructed seismic data to a time domain; and
      generate a seismic image of a subsurface of the Earth based on the transformed reconstructed seismic data.

18. The computer system of claim 17, wherein the received seismic data is uncorrelated.

19. A computer-readable storage medium having stored thereon computer-executable instructions which, when executed by a computer, cause the computer to:
   receive the seismic data acquired at one or more receivers due to one or more marine vibroseis sources that emit one or more vibroseis sweeps;
   apply a receiver motion correction algorithm to the seismic data to generate receiver motion corrected seismic data;
   perform a sweep correlation on the receiver motion corrected seismic data;
   transform the sweep correlated seismic data into a temporal Fourier domain to generate seismic data as a function of frequency;
   reconstruct the seismic data as a function of frequency to correct for one or more motions of the one or more marine vibroseis sources;
   transform the reconstructed seismic data to a time domain; and
   generate a seismic image of a subsurface of the Earth based on the transformed reconstructed seismic data.

20. The computer-readable storage medium of claim 19, wherein the sweep correlation is based on one or more frequencies of the vibroseis sweeps.

* * * * *